US008899949B2

(12) United States Patent
Aoki et al.

(10) Patent No.: US 8,899,949 B2
(45) Date of Patent: Dec. 2, 2014

(54) REFRIGERANT COMPRESSOR AND REFRIGERATION CYCLE APPARATUS

(75) Inventors: Toshimasa Aoki, Fuji (JP); Koji Satodate, Fuji (JP); Kazu Takashima, Fuji (JP)

(73) Assignee: Toshiba Carrier Corporation, Tokyo (JP)

( * ) Notice: Subject to any disclaimer, the term of this patent is extended or adjusted under 35 U.S.C. 154(b) by 215 days.

(21) Appl. No.: 13/496,660

(22) PCT Filed: Sep. 8, 2010

(86) PCT No.: PCT/JP2010/065441

§ 371 (c)(1), (2), (4) Date: Mar. 16, 2012

(87) PCT Pub. No.: WO2011/033977

PCT Pub. Date: Mar. 24, 2011

(65) Prior Publication Data

US 2012/0174617 A1 Jul. 12, 2012

(30) Foreign Application Priority Data

Sep. 18, 2009 (JP) ................................ 2009-217840

(51) Int. Cl.

*F01C 21/00* (2006.01)
*F01C 1/30* (2006.01)
*B32B 15/04* (2006.01)
*F04C 18/356* (2006.01)
*F01C 21/08* (2006.01)

(52) U.S. Cl.

CPC ......... *F04C 18/3564* (2013.01); *F04C 2230/92* (2013.01); *F05C 2201/0442* (2013.01); *F01C 21/0881* (2013.01); *F01C 21/08* (2013.01); *F05C 2201/0403* (2013.01); *F04C 2230/91* (2013.01); *F05C 2201/0439* (2013.01); *F05C 2201/0406* (2013.01); *F04C 2230/21* (2013.01)

USPC ............ 418/178; 418/179; 418/11; 428/623; 428/627

(58) Field of Classification Search

USPC ...................... 418/145, 63, 179, 178; 62/498
See application file for complete search history.

(56) References Cited

U.S. PATENT DOCUMENTS 4,618,317 A * 10/1986 Matsuzaki ...................... 418/63
4,944,663 A * 7/1990 Iizuka et al. ................. 418/178

(Continued)

FOREIGN PATENT DOCUMENTS

CN 1133818 1/2004
JP 60-026195 2/1985

(Continued)

OTHER PUBLICATIONS

Japanese Office Action issued in JP 2011-531898 dated Aug. 27, 2013.

(Continued)

*Primary Examiner* — Allen Flanigan
*Assistant Examiner* — Filip Zec
(74) *Attorney, Agent, or Firm* — DLA Piper LLP (US)

(57) ABSTRACT

A refrigerant compressor includes a compression unit having a roller and a vane for compressing refrigerant. The vane has a film having first to fourth layers on its metallic base member. The first layer is made of chromium. The second layer is made of chromium and tungsten-carbide. The third layer is made of metal-containing amorphous-carbon containing at least tungsten or tungsten-carbide. The fourth layer is made of non-metal-containing amorphous-carbon containing carbon and hydrogen. In the second layer, chromium content-rate on a first-layer side is larger than on a third-layer side, and tungsten-carbide content-rate on the third-layer side is larger than on the first-layer side. In the third layer, content-rate of the at least tungsten or tungsten-carbide on a second-layer side is larger than on a fourth-layer side. The roller with which an end-edge of the vane slidably-contacts is made of flake graphite cast iron containing molybdenum, nickel and chromium.

5 Claims, 5 Drawing Sheets

(56) References Cited

U.S. PATENT DOCUMENTS

| | | | | | |
|---|---|---|---|---|---|
| 5,108,813 | A | * | 4/1992 | Noda et al. | 428/141 |
| RE34,035 | E | * | 8/1992 | Dimigen et al. | 428/408 |
| 5,310,596 | A | * | 5/1994 | Bigelow et al. | 428/212 |
| 5,548,973 | A | * | 8/1996 | Komine et al. | 62/469 |
| 5,556,270 | A | * | 9/1996 | Komine et al. | 418/179 |
| 5,672,054 | A | * | 9/1997 | Cooper et al. | 418/63 |
| 5,951,273 | A | | 9/1999 | Matsunaga | |

FOREIGN PATENT DOCUMENTS

| | | |
|---|---|---|
| JP | 2000-256850 | 9/2000 |
| JP | 2001-225412 | 8/2001 |
| JP | 2007-032360 | 2/2007 |
| JP | 2009-035584 | 2/2009 |

OTHER PUBLICATIONS

English Language Translation of Japanese Office Action issued in JP 2011-531898 dated Aug. 27, 2013.
International Search Report issued in PCT.JP2010/065441 on Dec. 14, 2010.
International Preliminary Report on Patentability issued in PCT/JP2010/065441 on Apr. 11, 2012.
English Langauge Abstract of JP 2001-225412 published on Aug. 21, 2001.
English Langauge Translation of JP 2001-225412 published on Aug. 21, 2001.
English Language Abstract of JP 60-026195 published Feb. 9, 1985.
English Language Abstract of JP 2009-035584 published Feb. 12, 2009.
English Language Translation of JP 2009-035584 published Feb. 12, 2009.
English Language Abstract of JP 2000-256850 published on Sep. 19, 2000.
English Language Translation of JP 2000-256850 published on Sep. 19, 2000.
English Language Abstract of JP 2007-032360 published on Feb. 8, 2007.
English Language Translation of JP 2007-032360 published on Feb. 8, 2007.
Chinese Office Action issued in CN 201080041541.9 on Jan. 27, 2014.
English Language Translation of Chinese Office Action issued in CN 201080041541.9 on Jan. 27, 2014.
English Language Abstract of CN 1133818 published on Jan. 7, 2004.

* cited by examiner

REFRIGERANT COMPRESSOR AND REFRIGERATION CYCLE APPARATUS

CROSS-REFERENCE TO RELATED APPLICATIONS

This application is a National Stage of International Application No. PCT/JP2010/065441 (not published in English), filed Sep. 8, 2010, which, in turn, claims the benefit of Japanese Patent Application No. 2009-217840, filed Sep. 18, 2009.

TECHNICAL FIELD

The present invention relates to a refrigerant compressor and a refrigeration cycle apparatus.

BACKGROUND ART

In a compression unit for compressing refrigerant in a refrigerant compressor, slide members (such as vanes and pistons) are used for compressing refrigerant. A refrigerant compressor disclosed in PLT 1 listed below is known as one that improves anti-wear characteristics of its slide members.

The slide members (vanes) in the refrigerant compressor disclosed in the PLT 1 is constructed by forming a nitrided layer on a surface of a base member (core material), then hardening the base member, and further forming an intermediate layer and a single-layered or double-layered amorphous carbon layer(s) thereon. In a case where two of the amorphous carbon layers are formed, a lower layer (on a side of the base member) is made as a hydrogen-containing amorphous carbon layer and an upper layer is made as a metal-containing amorphous carbon layer.

CITATION LIST

Patent Literature

PLT 1: Japanese Patent Application Laid-Open No. 2007-32360

SUMMARY OF INVENTION

In the slide member disclosed in PLT 1, adherence between the base member and the intermediate layer becomes superior because deformation of the base member is restricted due to the formation of the nitrided layer on the surface of the base member for hardening the base member. However, there are problems in the adherence between the intermediate layer and the amorphous carbon layer or between the two amorphous carbon layers in a case where two of the amorphous carbon layers are provided. When repeatedly stressed, separation or crack may occur between the intermediate layer and the amorphous carbon layer or between the two amorphous carbon layers as mentioned above.

An object of the present invention is to provide a refrigerant compressor that restricts deformation of base members of vanes used in the refrigerant compressor and improves adherence of a film formed on a surface of the base member, and further can restrict wearing of vanes and members that slidably contact with the vanes, and to provide a refrigeration cycle apparatus that uses the refrigerant compressor.

A first aspect of the present invention provides a refrigerant compressor that includes a compression unit for compressing refrigerant used in a refrigeration cycle, a vane that is slidably provided in the compression unit hand has a base member made of metallic material, a film formed by sequentially layering first to fourth layers on the base member, and a roller that is rotatably provided in the compression unit and slidably contacts with an end edge with the vane. The first layer is a single layer of chromium, the second layer is an alloyed layer of chromium and tungsten carbide, the third layer is a metal-containing amorphous carbon layer containing at least one of tungsten and tungsten carbide, and the fourth layer is an amorphous carbon layer containing carbon and hydrogen without containing metal. In the second layer, a content rate of chromium on a side of the first layer is made larger than on a side of the third layer, and a content rate of tungsten carbide on a side of the third layer is made larger than on a side of the first layer. In the third layer, a content rate of the at least one of tungsten and tungsten carbide on a side of the second layer is larger than on a side of the fourth layer. The roller is made of flake graphite cast iron containing molybdenum, nickel and chromium.

A second aspect of the present invention provides a refrigeration cycle apparatus that includes the above refrigerant compressor, a condenser connected with the compressor for condensing refrigerant compressed by the compressor, an expansion device connected with the condenser for expanding refrigerant condensed by the condenser, and an evaporator connected with the condenser and the expansion device for evaporating refrigerant expanded by the expansion device and then recirculating the refrigerant to the compressor.

DESCRIPTION OF EMBODIMENT

Hereinafter, embodiments will be explained with reference to the drawings.

First Embodiment

Figure 1:
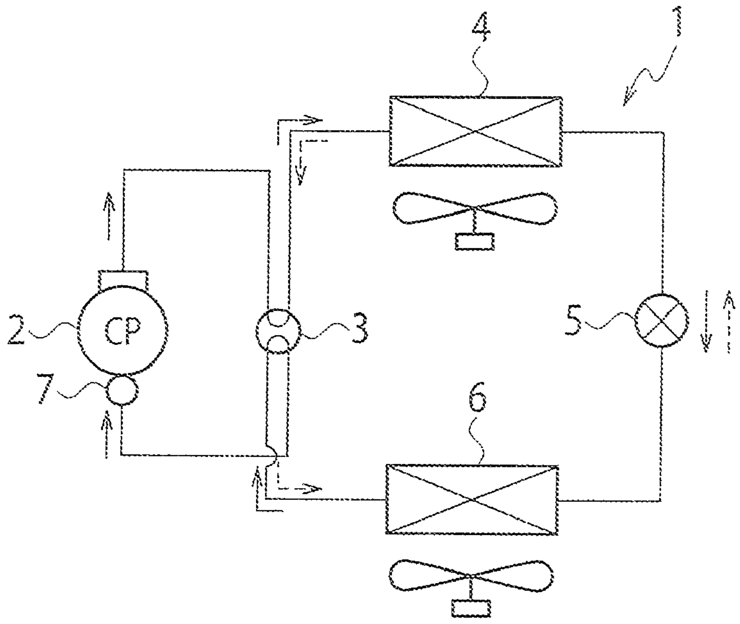
FIG. 1 is a schematic view of a refrigeration cycle apparatus according to a first embodiment.

A first embodiment will be explained with reference to FIGS. 1 to 5. FIG. 1 is a schematic view of a refrigeration cycle apparatus 1 according to the first embodiment.

A hermetically-sealed rotary-type refrigerant compressor 2, a four-way valve 3, an outdoor heat exchanger 4 that functions as a condenser at a cooling operation and functions as an evaporator at a heating operation, an expansion device 5, an indoor heat exchanger 6 that functions as an evaporator at the cooling operation and functions as a condenser at the heating operation, and an accumulator 7 are connected to configure the refrigeration cycle apparatus 1. Refrigerant circulates above components in the refrigeration cycle apparatus 1.

In the refrigeration cycle apparatus 1, at its cooling operation, refrigerant discharged from the refrigerant compressor 2 is supplied to the outdoor heat exchanger (condenser) 4 through the four-way valve 3 as shown by solid arrows, and condensed by heat exchanging with outside air. The condensed refrigerant flows out from the outdoor heat exchanger 4, and flows into the indoor heat exchanger (evaporator) 6 through the four-way valve 3. The refrigerant flowing into the indoor heat exchanger 6 is evaporated by heat exchanging with inside air to cool inside air. The refrigerant flowing out from the indoor heat exchanger 6 is suctioned into the refrigerant compressor 2 through the four-way valve 3 and the accumulator 7.

On the other hand, at its heating operation, refrigerant discharged from the refrigerant compressor 2 is supplied to the indoor heat exchanger (condenser) 6 through the four-way valve 3 as shown by dotted arrows, and condensed by heat exchanging with outside air to heat inside air. The condensed refrigerant flows out from the indoor heat exchanger 6, and flows into the outdoor heat exchanger (evaporator) 4 through the expansion device 5. The refrigerant flowing into the outdoor heat exchanger 4 is evaporated by heat exchanging with outside air. The evaporated air flows out from the outdoor heat exchanger 4, and is suctioned into the refrigerant compressor 2 through the four-way valve 3 and the accumulator 7.

Subsequently, the refrigerant flows sequentially in a similar way, so that the operation of the refrigeration cycle apparatus 1 is continued. As the refrigerant, HFC refrigerant, HC (hydrocarbons) refrigerant, carbon dioxide refrigerant and so on may be used.

Figure 2:
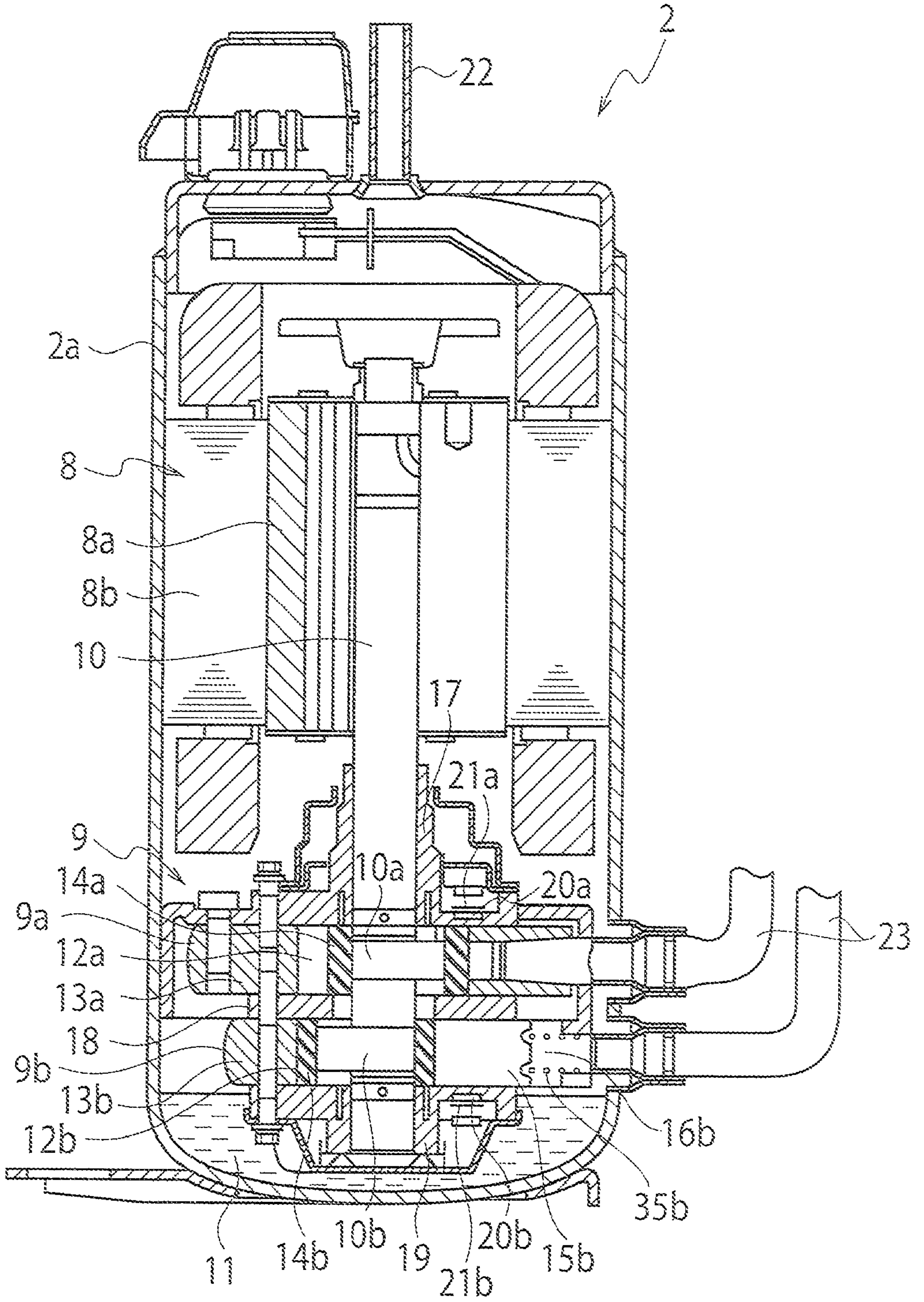
FIG. 2 is a longitudinal cross-sectional view showing an internal configuration of a refrigerant compressor.

The refrigerant compressor 2 is a 2-cylinder type and includes a sealed case 2*a*, as shown in FIG. 2. An electrical motor 8 and a rotational compression unit 9 are housed in the sealed case 2*a*. The electrical motor 8 and a rotational compression unit 9 are coupled with each other by a rotary shaft 10. The rotary shaft 10 has eccentric portions 10*a* and 10*b*.

The electrical motor 8 is comprised of a rotor 8*a* and a stator 8*b*. The electrical motor 8 may be any of a brush-less DC synchronous motor, an AC motor, a motor driven by a commercial electric power source, and so on.

Refrigerant oil 11 for lubricating the rotational compression unit 9 is accumulated at a bottom of the sealed case 2*a*. POE (polyol esther), PVE (polyvinyl ether), PAG (polyalkylene glycol), and so on are used as the refrigerant oil 11.

Figure 3:
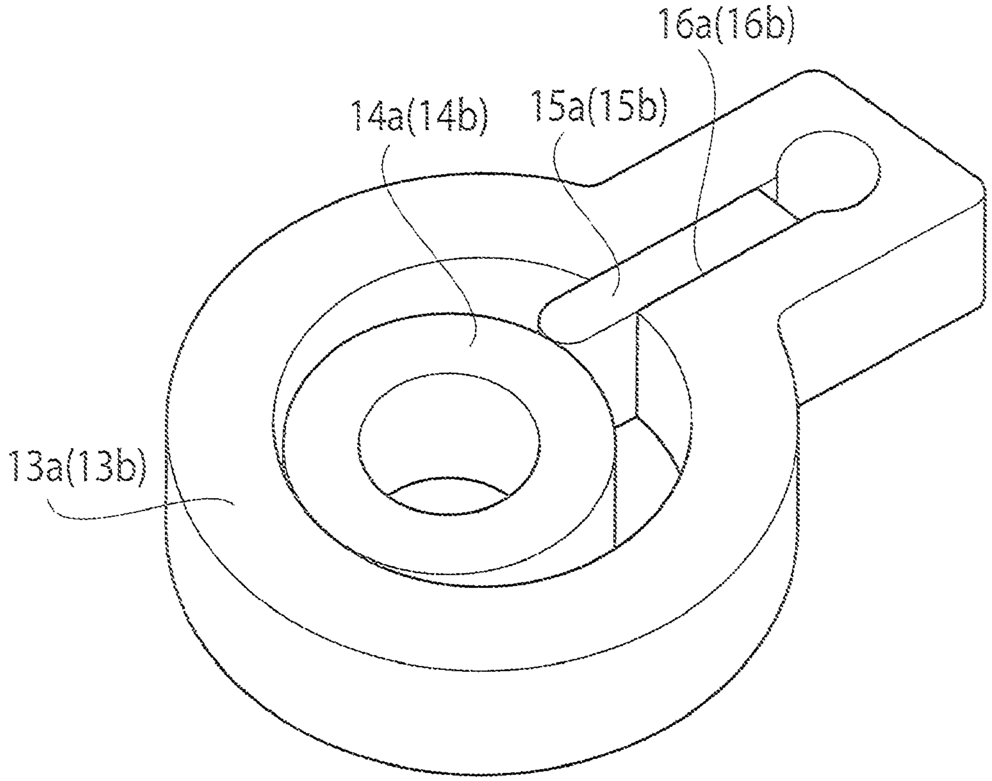
FIG. 3 is a perspective view, showing a cylinder, a roller and a vane that constitute a compression unit.

The rotational compression unit 9 is comprised of a first compression unit 9*a* and a second compression unit 9*b*. The first compression unit 9*a* includes a cylinder 13*a* that forms a cylinder chamber 12*a*, and the second compression unit 9*b* includes a cylinder 13*b* that forms a cylinder chamber 12*b*. As shown in FIG. 3, a roller 14*a* and a vane (slide member) 15*a* are housed within the cylinder 13*a*. Similarly, a roller 14*b* and a vane (slide member) 15*b* are housed within the cylinder 13*b*. Note that a part of the second compression unit 9*b* is cross-sectioned with a different cross-sectional plane in FIG. 2 in order to show a connection between the vane 15*b* in the second compression unit 9*b* and a suction pipe 23.

The roller 14*a* is engaged to the eccentric portion 10*a* of the rotary shaft 10, and eccentrically rotates within the cylinder chamber 12*a* along with the rotation of the rotary shaft 10. The roller 14*b* is engaged to the eccentric portion 10*b* of the rotary shaft 10, and eccentrically rotates within the cylinder chamber 12*b* along with the rotation of the rotary shaft 10. The rollers 14*a* and 14*b* are made of flake graphite cast iron containing molybdenum, nickel and chromium. Note that the first compression unit 9*a* and the second compression unit 9*b* have an identical configuration, as shown in FIG. 3.

As shown in FIG. 3, the vane 15*a* is slidably housed within a slot 16*a* that is formed on the cylinder 13*a*. A spring (not shown) that biases the vane 15*a* in a direction for contacting an end edge of the vane 15*a* with an outer circumferential surface of the roller 14*a* is housed in the slot 16*a*. Similarly, the vane 15*b* is also slidably housed within a slot 16*b* that is formed on the cylinder 13*b*. A spring 35*b* (see FIG. 2) that biases the vane 15*b* in a direction for contacting an end edge of the vane 15*b* with an outer circumferential surface of the roller 14*b* is housed in the slot 16*b*.

Both end faces of the cylinder 13*a* of the first compression unit 9*a* are covered by a primary bearing 17 and a partition plate 18, respectively, and the cylinder chamber 12*a* is formed therewithin. Both end faces of the cylinder 13*b* of the first compression unit 9*b* are covered by a secondary bearing 19 and the partition plate 18, respectively, and the cylinder chamber 12*b* is formed therewithin. A discharge port 20*a* for communicating the cylinder chamber 12*a* with an inner space of the sealed case 2*a* and a discharge valve 21*a* for opening and closing the discharge port 20*a* are provided in the primary bearing 17. A discharge port 20*b* for communicating the cylinder chamber 12*b* with the inner space of the sealed case 2*a* and a discharge valve 21*b* for opening and closing the discharge port 20*b* are provided in the secondary bearing 19.

A discharge pipe 22 for discharging compressed refrigerant within the sealed case 2*a* toward the four-way valve 3 is connected to an upper portion of the sealed case 2*a*. Suction pipes 23 for introducing refrigerant from the accumulator 7 into the cylinder chambers 12*a* and 12*b* are connected to a lower side of the sealed case 2*a*.

Figure 4:
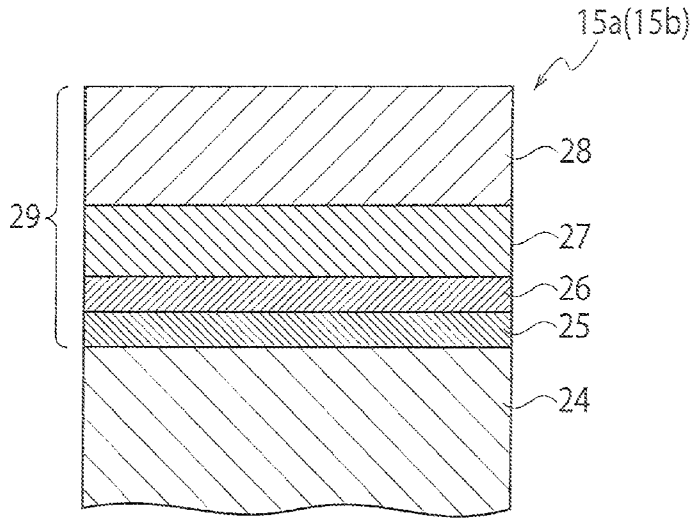
FIG. 4 is a cross-sectional view of an end edge of the vane.

FIG. 4 is a cross-sectional view of an end edge of the vane 15*a* or 15*b*. Note that the vanes 15*a* and 15*b* have an identical structure. A base member 24 of the vane 15*a* (15*b*) is made by cold-forging chromium-molybdenum steel supplied as a metal material. The base member 24 is treated with a surface-hardening process by carburized quenching, so that its surface hardness is made up to 650 in Vickers hardness. Note that the above-mentioned surface-hardening process is not meant to harden only a surface of the base member 24 but meant to harden at least the surface of the base member 24, and contains a case where an entirety of the base member 24 is treated with a hardening process.

Further, a film 29 in which first to fourth layers 25 to 28 are layered sequentially is formed on the surface of the base member 24 that has been treated with the a surface-hardening process. The first layer 25 is a single layer of chromium (Cr). The second layer 26 is an alloyed layer of chromium and tungsten carbide (WC). The third layer 27 is an amorphous carbon layer containing tungsten (W). The fourth layer 28 is an amorphous carbon layer containing carbon and hydrogen without containing metal. Note that the third layer 27 may be an amorphous carbon layer containing tungsten carbide instead of tungsten, or an amorphous carbon layer containing both tungsten and tungsten carbide.

In the second layer 26, formed is a content gradient such that a content rate of chromium on its side of the first layer 25 is made larger than that on its side of the third layer 27 and a content rate of tungsten carbide on its side of the third layer 27 is made larger than that on its side of the first layer 25.

In the third layer 27, formed is a content gradient such that a content rate of tungsten on its side of the second layer 26 is made larger than that on its side of the fourth layer 28.

With respect to each thickness of the layers 25 to 28, the first layer 25 has 0.1 μm, the second layer 26 has 0.2 μm, the third layer 27 has 0.5 μm, and the fourth layer 28 has 2.2 μm, so that total thickness of the film 29 is 3 μm.

Figure 5:
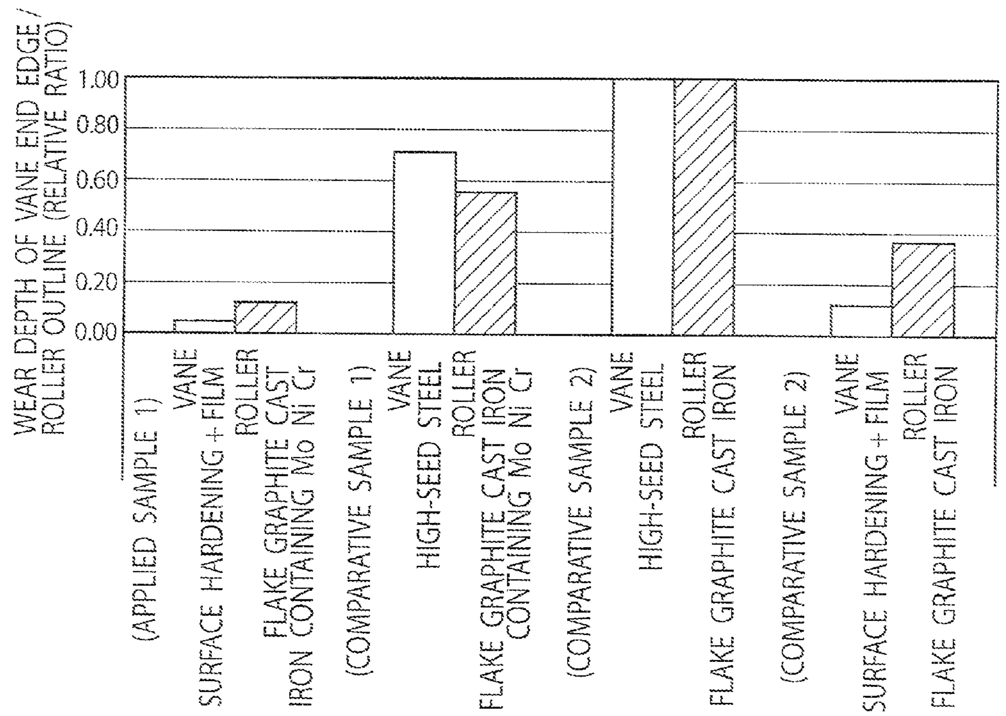
FIG. 5 is a graph chart showing wear depth of the vane and the roller.

A graph chart in FIG. 5 shows measured results of each wear depth of the vane 15*b* (15*a*) and the roller 14*b* (14*a*) due to operation of the refrigerant compressor 2.

In the above measurements, relative wear depths are measured under conditions shown below.

(Applied Sample 1)

Vane: the film 29 is formed on the surface-hardened base member 24 (the vanes 15*a* and 15*b* shown in FIG. 4)

Roller: made of flake graphite cast iron containing molybdenum, nickel and chromium (the rollers 14*a* and 14*b*)

(Comparative Sample 1)

Vane: made of high-speed steel (SKH51)

Roller: made of flake graphite cast iron containing molybdenum, nickel and chromium (similarly to the rollers 14*a* and 14*b*)

(Comparative Sample 2)

Vane made of high-speed steel (SKH51)

Roller: made of flake graphite cast iron (Comparative Sample 3)

Vane: the film 29 is formed on the surface-hardened base member 24 (similarly to the vanes 15*a* and 15*b* shown in FIG. 4)

Roller: made of flake graphite cast iron

Further, in the above measurements, the vanes and the rollers of the Applied Example 1 or the Comparative Example 1 to 3 are installed in the rotational compression unit 9 of the refrigerant compressor 2, and the vanes are subject to be heavily impacted to the rollers by forcibly operating the rotational compression unit 9 so as to suction fluid refrigerant intermittently and repeatedly. Note that condensation temperature is set to 65° C. in the above measurements.

According to the measurement results shown in FIG. 5, it can be found that the wear depths of the vanes and the rollers in the Applied Example 1 are drastically smaller that those in the other Comparative Examples.

In this manner, elastic deformation of the base member 24 to which a large load applies can be restricted by treating the metallic base member 24 of the vanes 15*a* and 15*b* with a surface-hardening process by carburized quenching. Therefore, deformation of the film 29 to which a large load applies can be restricted, so that the adherence between the base member 24 and the film 29 and the adherences between the layers 25 to 28 in the film 29 can improve.

With respect to the four layers 25 to 28 that constitutes the film 29, the first layer 25 is a single layer of chromium, the second layer is an alloyed layer of chromium and tungsten carbide, the third layer 27 is a metal-containing amorphous carbon layer containing at least one of tungsten and tungsten carbide, the fourth layer 28 is an amorphous carbon layer containing carbon and hydrogen without containing metal. In addition, in the second layer 26, formed is a content gradient such that a content rate of chromium on its side of the first layer 25 is made larger than that on its side of the third layer 27 and a content rate of tungsten carbide on its side of the third layer 27 is made larger than that on its side of the first layer 25. Further, in the third layer 27, formed is a content gradient such that a content rate of tungsten on its side of the second layer 26 is made larger than that on its side of the fourth layer 28.

Therefore, differences of hardness between the first layer 25 and the second layer 26, between the second layer 26 and the third layer 27 and between the third layer 27 and the fourth layer 28 become deduced, respectively, and thereby the adherences between the layers 25 to 28 improves, so that cracks in the film 29 can be restricted.

In addition, since the fourth layer 28 located outermost in the film 29 is an amorphous carbon layer containing carbon and hydrogen without containing metal, it can be more hardened than in a case where a metal-containing amorphous carbon layer is located outermost, so that anti-wear characteristics of the vanes 15*a* and 15*b* can improve.

Further, as shown in the measurement results of FIG. 5, wear depths of the vanes 15*a* and 15*b* and the rollers 14*a* and 14*b* can be made small by sliding the end edges of the vanes 15*a* and 15*b* in each of which the film 29 is formed on a surface of the surface-hardened base member 24 onto the rollers 14*a* and 14*b* made of flake graphite cast iron containing molybdenum, nickel and chromium. Therefore, the highly reliable refrigerant compressor 2 with small wear depths of the vanes 15*a* and 15*b* and the rollers 14*a* and 14*b* can be realized.

Note that, if hardness of a base member of a vane is sufficiently high (for example, high-speed tool steel refined to HRC63), the same advantage as the advantage achieved by the above-mentioned Applied Example 1 can be obtained without a surface-hardening process.

In addition, tests are done under the same condition as the condition of the measurements shown in FIG. 5 using test pieces whose surface roughness of the vanes 15*a* and 15*b* with the above-mentioned film 29 is made to Rz 0.8, Rz 1.6 and Rz 2.4. As a result, the test pieces with Rz 0.8 and Rz 1.6 bring good results without separation of the film, but the test piece with Rz 2.4 tends to bring a minor separation of the film. Therefore, it is preferable that the surface roughness of the vanes 15*a* and 15*b* after forming the film 29 is made to equal-to or lower-than Rz 1.6.

Second Embodiment

A second embodiment will be explained with reference to FIGS. 6 and 7. Note that, since fundamental configuration of refrigerant compressors in the second embodiment and in following other embodiments are the same as that of the refrigerant compressor 2 in the first embodiment, their fundamental configuration will be explained with reference to FIGS. 1 to 4.

In the second embodiment, the cylinders 13*a* and 13*b* are made of flake graphite cast iron or made of sintered metal whose surface is treated with a porosity sealing process.

Figure 6:
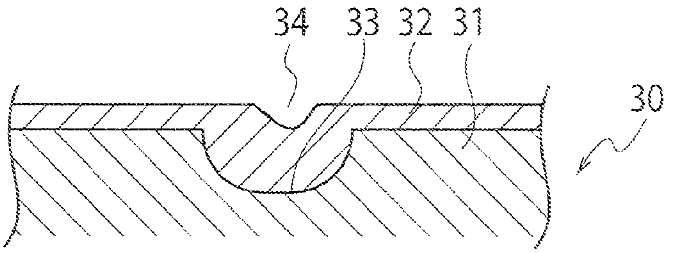
FIG. 6 is a cross-sectional view of sintered metal treated with a porosity sealing process according to a second embodiment.

FIG. 6 is a cross-sectional view of the sintered metal 30 whose surface is treated with a porosity sealing process. In the sintered metal 30, its base member 31 is made of iron, copper and carbon-based sintered alloy, and a ferrosoferric oxide film 32 is formed on the base member 31 with a steam treatment process. In its sintering process, a porous hole(s) 33 is formed on the surface of the base member 31, but the porous hole 33 is filled with the film 32. Note that a minute dent 34 tends to appear above the porous hole 33 on the surface of the film 32.

Figure 7:
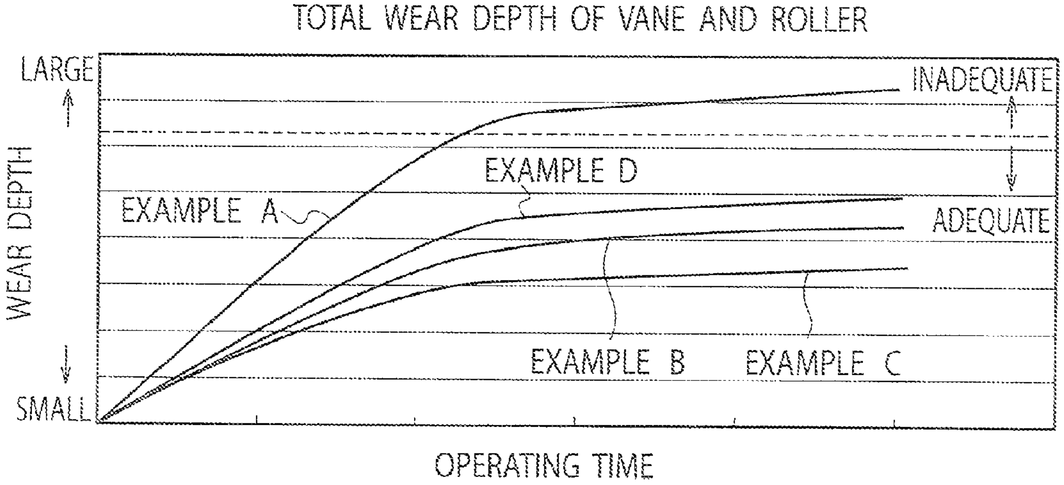
FIG. 7 is a graph chart showing a total wear depth of the vane and the cylinder.

FIG. 7 is a graph chart showing measurement results of a total wear depth of the vane 15*a* (15*b*) and the cylinder 13*a* (13*b*) at a slidably contact portion between a side surface of the vane 15*a* (15*b*) and a surface of the slot 16*a* (16*b*) of the cylinder 13*a* (13*b*). Note that the films 29 that slidably contact with surfaces of the slot 16*a* (16*b*) are also formed on side surfaces of the vane 15*a* (15*b*).

In the above measurements, the vanes 15*a* and 15*b* in which the films 29 are also formed on their side surfaces are used in all Examples A to D. In addition, the cylinders 13*a* and 13*b* made of spheroidal graphite cast iron are used in the Example A, the cylinders 13*a* and 13*b* made of flake graphite cast iron are used in the Example B, the cylinders 13*a* and 13*b* made of flake graphite cast iron with addition of vanadium and phosphorus are used in the Example C, and the cylinders 13*a* and 13*b* made of the sintered metal 30 with the film 32 shown in FIG. 6 are used in the Example D.

Further, the above measurements, the vanes on which the film 29 is formed and the cylinder of the Example A to D are installed in the rotational compression unit 9 of the refrigerant compressor 2, and the vanes are subject to be heavily impacted to the rollers by forcibly operating the rotational compression unit 9 so as to suction fluid refrigerant intermittently and repeatedly, similarly to the measurement in the first embodiment.

According to the measurement results, the wear depth is large in the case where the cylinders are made of spheroidal graphite cast iron (Example A), so that it can be found that the configuration in the Example A is not adequate for being used in the refrigerant compressor 2. However, the wear depths are small in the cases of the Examples B to D, so that it can be found that their configurations are adequate for being used in the refrigerant compressor 2.

Third Embodiment

A third embodiment will be explained based on a Table 1 shown below. In the present embodiment, the above-explained film 29 composed of the first layer 25 to the fourth layer 28 is formed on a surface of the rotary shaft 10.

The Table 1 shows measurement results of relationships of material of the rotary shaft 10, with-or-without the film 29 on the rotary shaft 10 and burnout characteristics of the shaft. In the Table 1, the burnout characteristics become better in order of rank C, B and A.

TABLE 1

| MATERIAL OF ROTARY SHAFT | WITH/ WITHOUT FILM | BURNOUT CHARACTER-ISTICS |
|---|---|---|
| SPHEROIDAL GRAPHITE CAST IRON | WITHOUT | B |
| SPHEROIDAL GRAPHITE CAST IRON | WITH | A |
| FLAKE GRAPHITE CAST IRON | WITHOUT | B |
| FLAKE GRAPHITE CAST IRON | WITH | A |
| CHROME-MOLYBDENUM STEEL | WITHOUT | C |
| CHROME-MOLYBDENUM STEEL | WITH | A |

According to the measurement results, it can be found that the burnout characteristics improve due to the formation of the film 29 with any material of the rotary shaft 10 and thereby burnouts can be restricted.

For the refrigerant compressor 2, expansion of variable rotational speed of the rotational compression unit 9 is required. Especially, a low frequency rotation brings a lubricating condition wherein oil film pressure by shaft rotational speed cannot raise sufficiently, so that the rotary shaft 10 may directly contact with its bearing(s) (the primary bearing 17 and the secondary bearing 19) without interposing an oil film. Therefore, formation of the film 29 on the surface of the rotary shaft 10 can restricts burnouts under a operational state at a low frequency rotation, and thereby wears at slidably contact portion can be reduced.

Fourth Embodiment

A fourth embodiment will be explained based on a Table 2.

In the fourth embodiment, end faces of the bearings (the primary bearing 17 and the secondary bearing 19) slidably contact with side surfaces of the vanes 15*a* and 15*b*, respectively. The primary bearing 17 and the secondary bearing 19 are made of flake graphite cast iron and their surfaces are made of the sintered metal 30 (FIG. 6) whose surface is treated with a porosity sealing process, as explained in the second embodiment. Note that the above-explained film 29 is formed on the side surfaces of the vanes 15*a* and 15*b* that slidably contact with the bearings 17 and 19.

Anti-wear characteristics of the bearings 17 and 19 are measured, using the vanes 15*a* and 15*b* in which the films 29 are formed also on their side surfaces, with the bearings 17 and 19 made of flake graphite cast iron and with the bearings 17 and 19 made of sintered metal 30 with the film 32. The measurement results are shown in the Table 2 below.

TABLE 2

| MATERIAL OF BEARINGS | BASE MEMBER OF VANE | WITH/ WITHOUT FILM | ANTI-WEAR CHARACTERISTICS OF BEARINGS |
|---|---|---|---|
| FLAKE GRAPHITE CAST IRON | TOOL STEEL SKH51 | WITH | A |
| SINTERED ALLOY | TOOL STEEL SKH51 | WITH | A |

In the above measurements, the bearings 17 and 19 whose material is different from that of the vanes on which the film 29 is formed are installed in the rotational compression unit 9 of the refrigerant compressor 2, and the vanes 15*a* and 15*b* are subject to be heavily impacted to the rollers 14*a* and 14*b* by forcibly operating the rotational compression unit 9 so as to suction fluid refrigerant intermittently and repeatedly, similarly to the measurement in the first embodiment.

According to the measurement results, it can be found that the bearings 17 and 19 can achieve superior anti-wear characteristics (rank A) in any case of the bearings 17 and 19 made of flake graphite cast iron and the bearings 17 and 19 made of sintered metal 30 with the film 32.

Note that flake graphite cast iron has a feature of minute graphite structure, so that its oil-retaining characteristics are superior under usage environment of concern for oil-shortage and thereby can improve anti-wear characteristics.

In addition, by using the sintered metal 30, the above-explained dent 34 improves the oil-retaining characteristics, so that the anti-wear characteristics can be enhanced.

Fifth Embodiment

A fifth embodiment will be explained. The fifth embodiment relates to a combination of types of the refrigerant oil 11 accumulated in the sealed case 2*a* and types of the refrigerant.

In the fifth embodiment, HFC refrigerant is used as the refrigerant, and POE (polyol esther) or PVE (polyvinyl ether) is used as the refrigerant oil 11.

HFC refrigerant without containing chlorine has no lubrication characteristics, so that lubrication performance at slidably contact portions depends only on the refrigerant oil 11. Namely, lubrication performance when using refrigerant without containing chlorine may degrade compared to when using chlorine-containing refrigerant. Therefore, lubrication performance can be improved by using POE (polyol esther) or PVE (polyvinyl ether) as the refrigerant oil 11.

The invention claimed is:

1. A refrigerant compressor comprising:

a compression unit constructed and arranged to compress refrigerant used in a refrigeration cycle;

a vane that is slidably provided in the compression unit, the vane comprising a base member made of metallic material;

a film comprising sequentially layered first to fourth layers layered on the base member, wherein:

the first layer is a single layer of chromium, the second layer is an alloyed layer of chromium and tungsten carbide, a content rate of chromium on a side facing the first layer is larger than on a side facing the third layer, and a content rate of tungsten carbide on the side facing the third layer is larger than on the side facing the first layer, the third layer is a metal-containing amorphous carbon layer comprising at least one of tungsten and tungsten carbide, and a content rate of the at least one of tungsten and tungsten carbide on a side facing the second layer is larger than on a side facing the fourth layer, and the fourth layer is an amorphous carbon layer comprising carbon and hydrogen and not comprising metal, and a thickness of the fourth layer is greater than a total thickness of the first to third layers; and a roller that is rotatably provided in the compression unit and slidably contacts with the vane at an end edge of the vane, the roller being made of flake graphite cast iron comprising molybdenum, nickel, and chromium.

2. The refrigerant compressor according to claim 1, wherein the compression unit further includes a cylinder that houses the vane and the roller, and the cylinder is made of flake graphite cast iron or made of sintered metal whose surface is treated with a porosity sealing process.

3. The refrigerant compressor according to claim 1, wherein the compression unit further includes a rotatable rotary shaft, and the shaft comprises a second base member made of metallic material and the film comprising the first to fourth layers layered on the second base member.

4. The refrigerant compressor according to claim 1, wherein the compression unit further includes a bearing that slidably contacts with the vane, and the bearing is made of flake graphite cast iron or made of sintered metal whose surface is treated with a porosity sealing process.

5. A refrigeration cycle apparatus comprising:

the refrigerant compressor according to claim 1;

a condenser connected with the compressor and constructed and arranged to condense refrigerant compressed by the compressor;

an expansion device connected with the condenser and constructed and arranged to expand refrigerant condensed by the condenser; and an evaporator connected with the condenser and the expansion device and constructed and arranged to evaporate refrigerant expanded by the expansion device and recirculate the refrigerant to the compressor.

* * * * *